(12) United States Patent
Østergaard (10) Patent No.: US 9,155,315 B2
(45) Date of Patent: Oct. 13, 2015

(54) METHOD AND AN APPARATUS FOR SUSPENDING BIRDS FROM AN OVERHEAD CONVEYOR

(71) Applicant: LINCO FOOD SYSTEMS A/S, Trige (DK)

(72) Inventor: Bent Østergaard, Svenstrup (DK)

(73) Assignee: LINCO FOOD SYSTEMS A/S, Trige (DK)

( * ) Notice: Subject to any disclaimer, the term of this patent is extended or adjusted under 35 U.S.C. 154(b) by 0 days.

(21) Appl. No.: 14/428,250

(22) PCT Filed: Sep. 12, 2013

(86) PCT No.: PCT/DK2013/050294
§ 371 (c)(1),
(2) Date: Mar. 13, 2015

(87) PCT Pub. No.: WO2014/040604
PCT Pub. Date: Mar. 20, 2014

(65) Prior Publication Data
US 2015/0245628 A1 Sep. 3, 2015

(30) Foreign Application Priority Data
Sep. 17, 2012 (DK) .................................. 2012 70572

(51) Int. Cl.
*A22C 21/00* (2006.01)
(52) U.S. Cl.
CPC ......... *A22C 21/0053* (2013.01); *A22C 21/0007* (2013.01)
(58) Field of Classification Search
USPC .................................. 452/177–179, 182–184
See application file for complete search history.

(56) References Cited

U.S. PATENT DOCUMENTS

| | | | |
|---|---|---|---|
| 3,315,299 A * | 4/1967 | Danielsson ................... | 198/416 |
| 7,134,956 B2 * | 11/2006 | Lee ................... | 452/53 |
| 7,597,615 B2 * | 10/2009 | van den Nieuwelaar et al. ............................ | 452/182 |
| 8,105,138 B2 * | 1/2012 | Van Den Nieuwelaar et al. ............................ | 452/177 |
| 8,328,605 B2 * | 12/2012 | McMurray et al. ........... | 452/182 |
| 2011/0136422 A1 | 6/2011 | McMurray et al. | |

FOREIGN PATENT DOCUMENTS

| | | |
|---|---|---|
| DE | 3048342 A1 | 7/1982 |
| EP | 2253218 A1 | 11/2010 |
| WO | WO-2011-116774 A1 | 9/2011 |

OTHER PUBLICATIONS

International Search Report for PCT/DK2013/050294, mailed Nov. 28, 2013; ISA/EP.

* cited by examiner

*Primary Examiner* — Richard Price, Jr.
(74) *Attorney, Agent, or Firm* — Harness, Dickey & Pierce, PLC (57) ABSTRACT

A method for suspending birds from an overhead conveyor, comprises the following sequence of steps: A) each bird is arranged in a holder with its legs and/or feet projecting from a first opening therein and its neck at a neck end, B) orientation of the feet is determined, C) the bird is rotated about an axis of rotation extending between the first opening and the neck end until a predetermined orientation of the legs and/or feet is reached, and D) the feet or legs of the bird are arranged in a shackle on the conveyor. The rotation may be achieved either by rotation the holder or by rotating the bird in the holder. In an apparatus according to the invention a monitoring station and a rotation station is provided for performing steps B) and C). The holders are preferably open-ended with a second opening at the neck end.

16 Claims, 7 Drawing Sheets

METHOD AND AN APPARATUS FOR SUSPENDING BIRDS FROM AN OVERHEAD CONVEYOR

CROSS-REFERENCE TO RELATED APPLICATIONS

This application is a 371 U.S. National Stage of International Application No. PCT/DK2013/050294, filed on Sep. 12, 2013, which claims priority to Danish Patent Application No. PA 2012 70572, filed on Sep. 17, 2012. The entire disclosures of the above applications are incorporated herein by reference.

The present invention relates to a method for suspending birds from an overhead conveyor, where the feet or legs of each bird are arranged in a shackle on the conveyor.

In numerous poultry slaughterhouses all over the world the suspension of the birds is performed manually, meaning that an operator grabs each bird and arranges its feet or legs in the shackle while supporting the weight of the body of the bird using his hands and arms. This work is not only heavy, but is also performed in a dusty and noisy environment, particularly when the birds are not stunned prior to being suspended.

Methods have been devised for suspending the birds in a more or less automated manner, an example being disclosed in the applicants own previous application WO2011/116774. Though this prior art apparatus and method have clear advantages seen from a working environment point of view it is still desired to provide an alternative method, which allows the suspension process to run even more smoothly and with an even larger number of birds being suspended correctly, and an apparatus for use in such a process.

This is achieved with a method, comprising the following sequence of steps performed prior to the feet or legs of the bird being arranged in the shackle:

A) each bird is arranged in a holder with its legs and/or feet projecting from a first opening therein and its neck at a neck end of the holder, B) orientation of the legs and/or feet is determined, C) the bird is rotated about an axis of rotation extending between a plane defined by the first opening of the holder and a plane defined by the neck end of the holder until a predetermined orientation of the legs and/or feet is reached.

Moreover, the object of the invention is achieved with an apparatus for suspending birds from an overhead conveyor, comprising a plurality of holders each having a neck end adapted from receiving the neck of a bird and a first opening from which the legs and/or feet of the bird may project, a monitoring station for determining the orientation of the legs and/or feet of each bird, and a rotation station for rotating the birds about an axis of rotation extending between a plane defined by the first opening of the holder and a plane defined by the neck end of the holder. The monitoring and rotation stations may be combined, so that the monitoring and rotation takes place at substantially the same place.

To minimize the space needed for the rotation, the axis of rotation preferably extends between the first opening of the holder and the neck end of the holder, possibly coinciding with the symmetry axis of the holder, but it may also be located outside the space defined by the holder.

The holders are preferably hollow with a cavity corresponding substantially in size to the body of the bird, so that it surrounds the body. This not only keeps the bird from falling when the holder is rotated but may also contribute to keeping the bird calm if birds are processed in a conscious state, i.e. without being stunned.

The holders are preferably open-ended having a first opening and a second opening at the neck end, through which the neck and/or head of the bird may project.

One suitable embodiment of the holder is an open-ended frustum of a cone, where the bird is arranged with the neck at the end opening having the smallest diameter and with the legs and/or feet projecting from the end opening having the largest diameter. The cone may be continuous, made for example from a sheet material, such as sheet metal, or may have openings as will be described in more detail below, but such openings should be designed to avoid damages to the birds, particularly to the wings, during insertion into the holder and subsequent emptying of the holder.

The arrangement of the bird in the holder may be performed manually and may be done without lifting the bird, for example by arranging the birds on a supporting surface and then pulling them individually into the holders. When using an open-ended holder this may be done by the operator passing his hand through the two openings of the holder, grabbing the head, neck, legs or feet of the bird and then pulling his hand back. Alternatively, the holder may have a longitudinal slit extending between the two openings and allowing passage of the arm of the operator or the neck or legs of the bird. The operator may then reach over the holder, grab the bird and pull it into the holder, passing either his hand or part of the bird through the slit. This process may also be automated, using for example a robotic arm and a vision system for recognising the relevant part of the bird to be grabbed. It is presently preferred to pull the bird by its head as this is easy to locate and grab both for a human operator and for a robot and as the pull will then be in the direction of the feathers thus minimizing resistance.

If wishing to arrange the birds in the holders without pulling, they may for example be tipped into the holders by tilting a supporting surface on which they have previously been arranged, but this necessitates a relatively precise mutual positioning of the birds, the supporting surface and the holder and will only work with unconscious birds.

Particularly if processing live, unstunned birds they may be manually put into holders arranged with the axis of rotation being substantially vertical, where gravity and the natural tendency of birds to lie still when held tightly will keep them in place. A similar effect may be achieved with holders arranged with the axis of rotation inclined, but the inclination should then preferably not exceed 45 degrees from the vertical direction.

The optimal orientation of the holder during arrangement of the bird will depend on how the birds are arranged in the holders, and later processing steps, such as the arrangement of the feet or legs in shackles, may require a different angle. It may therefore be expedient for holders to be tiltable. During rotation for positioning of the legs or feet the holder may be arranged in any desired angle as long as the rotation does not result in the bird dropping out of the holder. At the end of the process, where the birds are to be transferred to the shackles it is usually expedient for the holder to be positioned so that the axis or rotation is horizontal or inclined more than 45 degrees from the vertical direction. A tilting of the holder from a more upright position towards the horizontal may even contribute to bringing the legs and/or feet of the bird into engagement with the shackles.

The rotation of the bird may be achieved either by rotating the holder or by rotating the bird within the holder.

Rotating the holder in the rotation station may be achieved in numerous ways, including the provision of a motor on each holder, but as the number of holders will usually be very big and as the holders must be able to withstand thorough cleaning, an external rotation station will usually be preferred. The holder is then rotated by engaging a contact member on the holder with a drive member of the external rotation station. The drive member may for example be a motor driven gear wheel engaging a curved toothed rack on the out surface of the holder. This is a very simple and reliable system requiring only little maintenance. Alternatively the rotation may be caused by mounting the holders in a relatively loose manner and conveying them past a friction member. When the surface of the holder engages the friction member, the holder will then be forced to turn and the contact with the friction member is interrupted when the holder has reached the desired position. The friction can, however, be influenced by the presence of dirt and/or water on the contacting surfaces, hence potentially leading to errors and it is therefore preferred to monitor the orientation of the legs and/or feet of the bird during or after the rotation to discover incorrect rotation and allow a further correctional rotation.

If instead choosing to rotate the bird within the holder, this too may be done in many ways, but it is presently preferred to activate an inner surface of the holder, which is in contact with the bird, to move in a direction perpendicular to and not intersecting the axis of the rotation. When the friction between the bird and the moving inner surface is sufficiently high, this will cause the bird to rotate in the holder. The risk of error resulting from dirt and/or water on the contacting surfaces and the correctional measures described above also applies here.

Independent of how the rotation of the bird is achieved, the holder may comprise two or more parts that are moveable in relation to each other so that the holder has an open position, where the parts are away from each other, and a closed position, where they are adapted for engaging the bird.

The inner surface may be embodied as a belt covering the inner surface of the holder. On one embodiment the belt is a continuous belt continuing through a slit extending between first and second openings and covering the outer side of the holder as will later be described in detail with reference to the drawing. Belts may be made from a sheet, mesh or interconnected modules and of rubber, plastic or metal, as long as it provides sufficient friction in contact with the bird and is easy to keep clean. Rollers or brushes may be used as alternatives to belts.

The determination of the orientation of legs and/or feet in the monitoring station may be performed manually by an operator or by using a camera or a sensor. It is noted that a very precise determination is not necessary, but that it may simply be determined that the orientation of the legs and/or feet is not yet the predetermined orientation of step C). If using a camera or like visual identification equipment, the orientation of the feet and/or the necessary rotation may be calculated by an image recognition program running on a computer and other software may be used for processing input from other types of sensors.

Holders may be provided with markers for tracking their position both with regards to rotation and to the different stations.

The invention was originally made with the purpose of easing the shackling of birds prior to slaughter and is therefore primarily been described with reference to birds having head and feet. It was, however, quickly realized that it may also be used later in the slaughter process, where the head and/or feet have been cut off. It should therefore be understood that whenever reference is made to the feet or the head of the bird, the legs or the neck, respectively, will be the obvious alternative in processes where the head and/or feet have previously been removed.

In the following the invention will be described in closer detail with reference the drawing, where.

Figure 1:
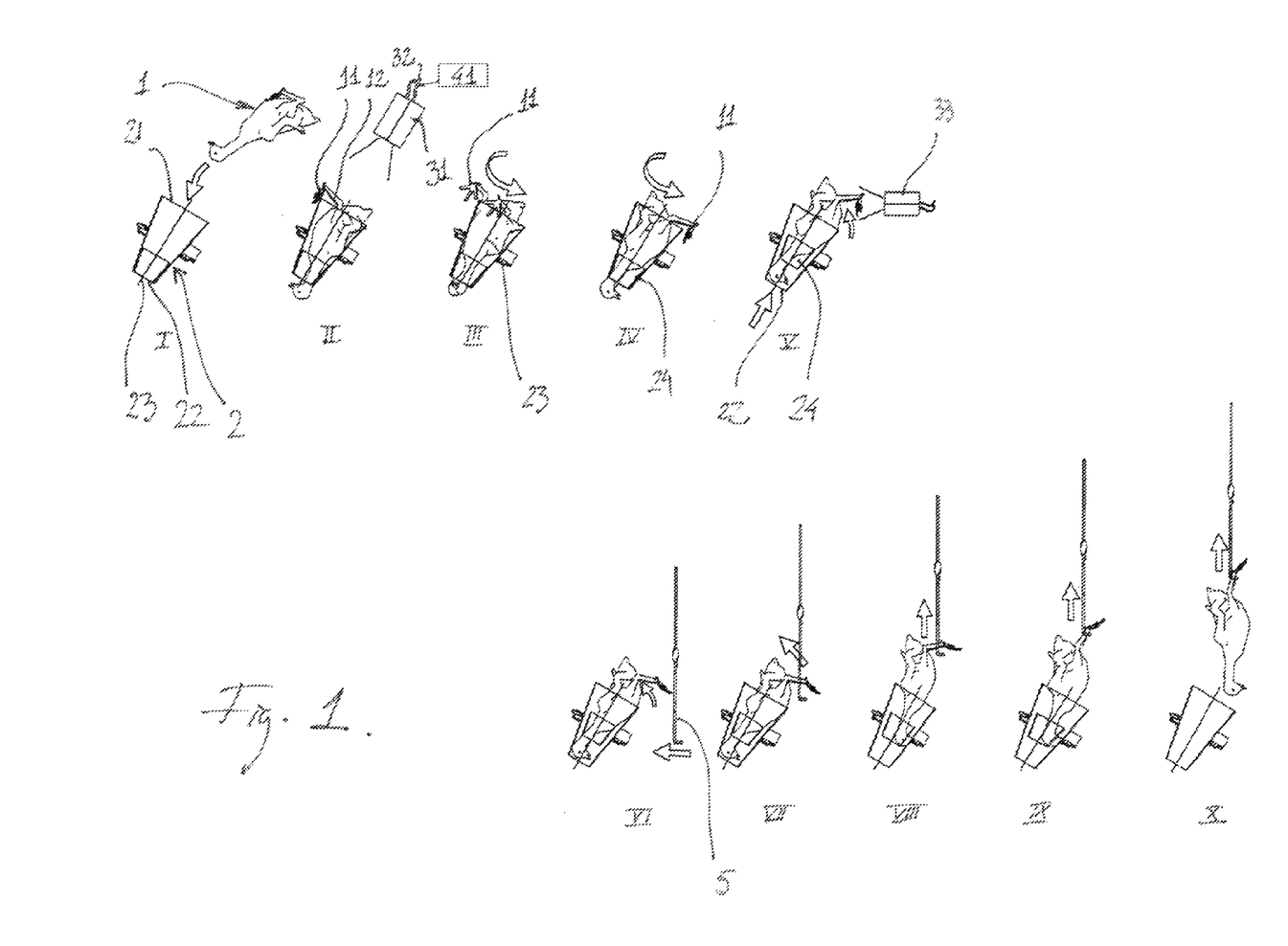
FIG. 1 is series of side view sketches showing the sequence of a method according to the invention.

The use of a method according to the invention for processing chickens is illustrated by the ten sketches I-X in FIG. 1, but it is to be understood that the method may be used for other kinds of birds including ducks, geese, turkeys, quails or pigeons if the size of the holders and other process equipment is modified accordingly. In the following reference will therefore be made to birds.

In sketch I a bird 1 is arranged in a holder 2 as shown by the arrow and as will be explained later. Here the holder 2 has the shape of a frustum of a cone with a first open end 21 facing upwards and a second open end 22 with a smaller diameter facing downwards. As may be seen in sketches II, III and IV this shape corresponds relatively well to the shape of the bird, but it is to be understood that other shapes may also be used as long as it provides a good hold of the bird. One alternative is a cylinder, which is equally easy to manufacture and hence cheap, but it will then be necessary to close the second end at least partially or arrange the holder horizontally. Another alternative is a bottle-shape providing a tighter fit at the shoulder and neck area of the bird, but this may make the holders more expensive and more difficult to clean. In addition, a very tight fit may make it difficult to get the bird back out of the holder.

It is presently preferred to make the holders in FIG. 1 from sheets of stainless steel, but other metals and polymers may also be used and the holders may have holes, openings and perforations in addition to the end openings described above. In FIG. 1, however, the holders have been illustrated as simple cones of a transparent material so that the relative orientation of the bird 1 may be easily seen.

As may also be seen in sketches II, III and IV the dimensions of the holder 2 is adapted so that the feet 11 and lower legs 12 of the bird is above its upper edge, i.e. projecting from the first opening 21, but it is to be understood that natural differences in the size and shape of the body of the birds will result in differences in the position of the feet.

In sketch II the orientation of the feet 11 of the bird is determined using a camera 31. The image from the camera may be evaluated manually, but considering the high number of birds processed in modern poultry slaughterhouses it is preferred to use a computer-based image recognition program for this task. Communication between the camera 31 and the computer 41 may be via cable 32 or a wireless connection.

If the feet 11 of the bird 1 are not in the predetermined orientation, which is optimal with respect to the later suspension from a shackle 5, the holder 2 is turned about the length axis 23 of the holder extending between the first opening 21 and the second opening 22 as shown by the arrow in sketch III to the position in sketch IV. Here the axis of rotation 23 is coinciding with the symmetry axis of the holder, but this need not be the case. It may in principle be located outside the holder, but still extending between the planes defined by the first and second openings. It is also to be understood that the entire holder does not need to turn, but that contact surfaces or members engaging the bird may be used for turning the bird inside the holder. Likewise it is to be understood that such contact surfaces or members does not have to form part of the holder, but may be surfaces or members of a separate turning device.

In sketch V a collar 24 has been raised from its initial position at the second opening 22 so that it has come into engagement with the bird 1 and has lifted it slightly upwards. This has resulted in the feet 11 and legs 12 of the bird being moved away from the first opening 21 of the cone 2, thus giving room for insertion of the shackle 5 as shown in sketch VI. If the collar is able to rotate about the axis of rotation, it may also serve as an inner contact surface of the holder and be used for rotating the bird.

As also shown in sketch V, the level of the feet 11 and/or legs 12 may be determined by means of a camera 33 and this information may be used for controlling the lift of the collar 24 so that the feet of all birds 1 are arranged at the same height regardless of the size and shape of the body. It is, however, to be understood that the method may also be performed without this lift, that the lift may be performed by other means than the collar 24, and that such a lift may be employed in connection with other types of holders. Like considerations apply to the determination of the level of the legs and/or feet.

Figure 2:
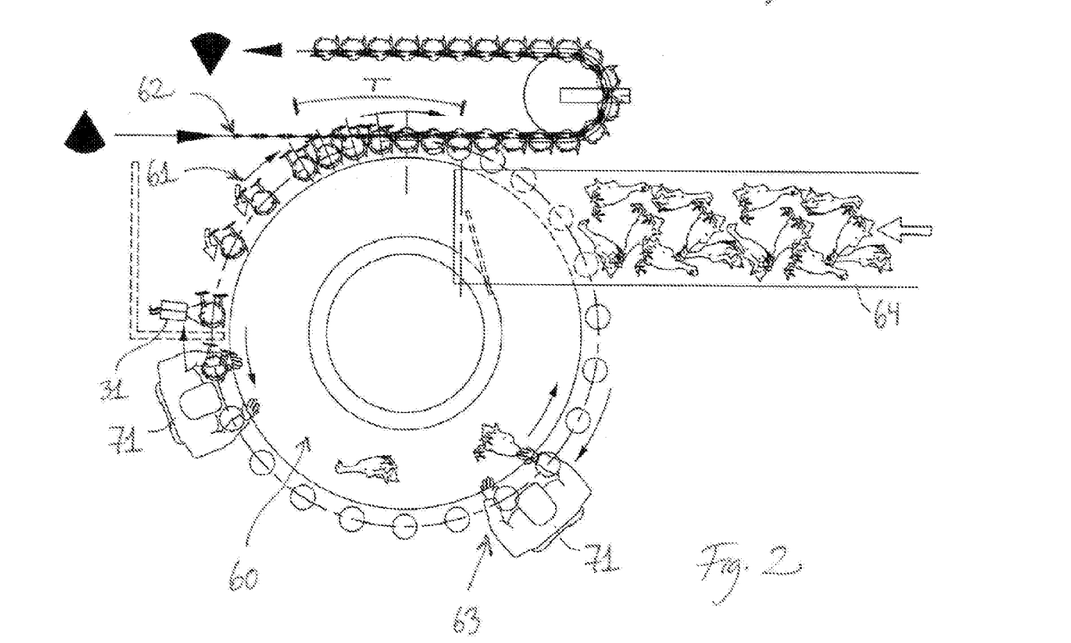
FIG. 2 is a schematic sketch of the layout of a bird processing system seen from above.

Sketches VI, VII and VIII show how the bird 1 is transferred to the shackle 5 by a movement of the holder 2 and the shackle 5 in relation to each other. This relative movement may be achieved in any suitable manner, but it is presently preferred to convey either the holders or the shackles along a curved path, so that they meet in a parallel transfer run T as shown in FIG. 2. By arranging the holders and shackles in appropriate heights in relation to each other at the transfer zone T, such curved movement will result in the feet 11 of the bird 1 passing through openings in the shackle and/or the legs being positioned above recesses therein. A subsequent or simultaneous upwards movement of the shackle 5 as shown in sketches VI, VII and VII will result in the bird 1 coming to hang from the shackle as in sketch IX and eventually being lifted out of the holder 2 as shown in sketch X. The path of the two conveyors 61, 62 may then move away from each other again as shown in FIG. 2, the holders returning to the loading station 63 for another run and the shackles 5 with the birds continuing to another process in the slaughterhouse, typically a scalding station (not shown).

Figure 3:
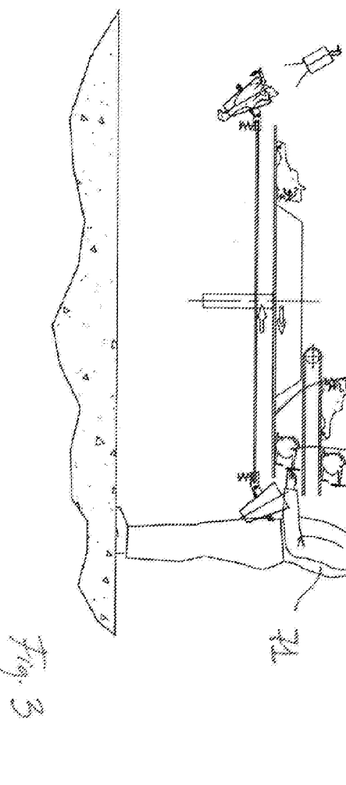
FIG. 3 is a schematic sketch of the layout of a bird processing system seen from the side.

As may also be seen in FIGS. 2 and 3 stunned birds are here supplied to the support surface 60 via a belt conveyor 64, which is arranged at a level above the support surface, but it is to be understood that the loading station 63 might also be arranged directly at the side of the belt conveyor 64. In this embodiment the loading station is illustrated with two operators 71, meaning that each operator will only have to fill every second holder, but it is to be understood that the number of operators may vary depending for example on the speed of rotation of the support surface 60 and the weight of the birds. It is also noted that in this embodiment the distance between the holders are varied over a process cycle so that the distance is relatively large at the loading station 63, giving the operators space and time for working. When reaching the transfer zone T the holders are accumulated, so that the distance between them comes to correspond to the distance between the shackles 5 on the shackle conveyor 62. For this purpose the speed of rotation of the support surface is higher than the speed of the shackle conveyor, the support surface for example rotating at a speed of 0.5 m/s and the shackle conveyor running at 0.25 m/s. In this way it is possible to process 6000 birds per hour.

Figure 4:
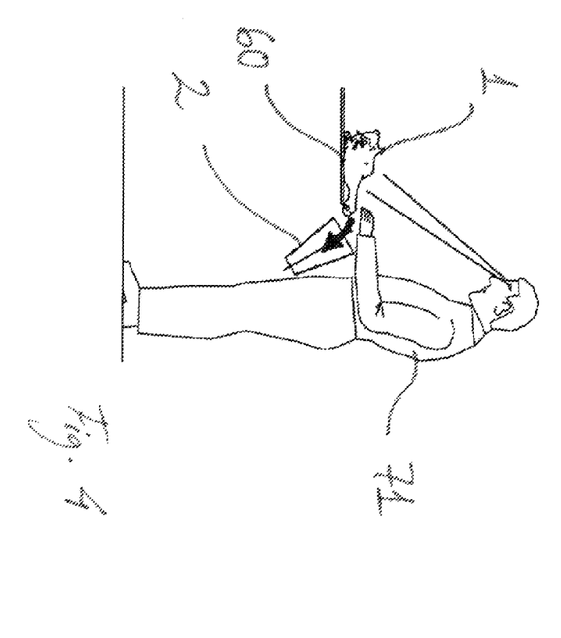
FIGS. 4-6 are sketches showing three different embodiments of loading stations for performing step A) of a method according to the invention.

The loading of the bird 1 into the holder 2 as shown in sketch I of FIG. 1 may be performed in many ways including manually lifting the bird and putting it neck down into a holder. Seen from a work environment point of view it is, however, desired to avoid such lifts and manual loading is therefore preferred to be done for example as shown in FIGS. 3 and 4, where the operator 71 grabs a bird 1 lying on a support surface 60 by the head and pulls it into the holder 2. To ease this process the holder may be provided with a slit (not shown) in the side giving room for the hand and/or arm of the operator. The slit does not have to go all the way from the first opening to the second opening as long as it makes the work of the operator easier. In FIGS. 1 and 3-12 the holders are arranged at an angle of approximately 30 degrees from the vertical direction to ease the insertion of the bird into the holder. This angle may, however, be adjusted to achieve the best possible balance between ease of handling and making the bird slide into the holder under the influence of gravity.

Figure 5:
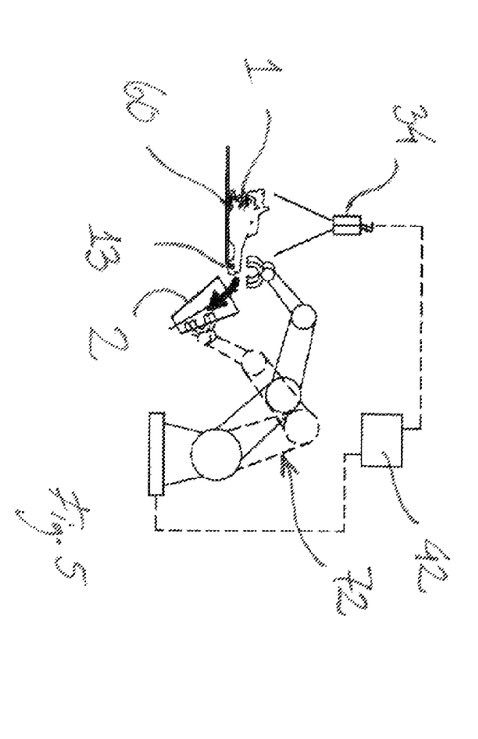

This manual process may be automated by providing a robotic arm 72 as shown in two different positions in FIG. 5 performing substantially the same job as the arm of the operator 71 in FIGS. 3 and 4. The robotic arm, however, needs information about the position of the head 13 of the bird in order to be able to grab it. To solve this, the birds 1 may be have been previously arranged in well defined positions on the support surface 60, but it is also possible to provide a vision based system 34, which provides this information to the robotic arm 72, possibly via a computer 42.

Figure 6:
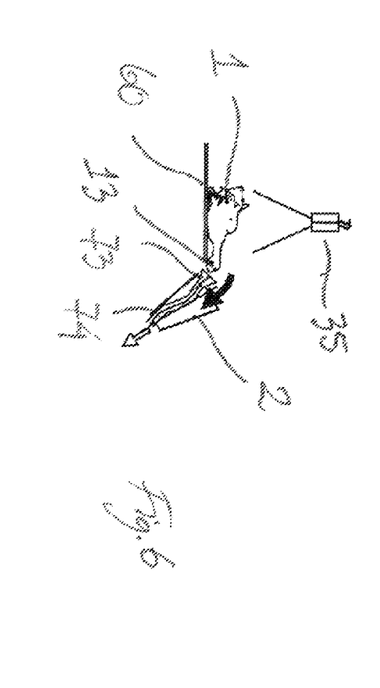

Still another embodiment is shown in FIG. 6, where a suction head 73 is grabbing the head 13 of the bird 1 and then pulling back down through the holder 2. The suction head 73 and associated vacuum hose 74 may, however, also be pulling through a slit (not shown) in the side of the holder as described above, and likewise it is to be understood that the arm of the operator 71 and the robotic arm 72 may be put through the holder as in FIG. 6. As for the robotic arm 72, the suction head 73 too will benefit from receiving a precise indication of the position of the head 13 of the bird from a camera 35.

In the description above referring to FIGS. 3-6 the different methods of arranging the bird in the holder all rely on the bird being grabbed by the head, but it will be understood that if the head has previously been removed, the neck may be grabbed instead. It that case the image recognition software of the vision based system 34 should of course be adapted for recognising necks instead of heads and likewise the design of the suction head 73 should be adapted.

The support surface 60 in FIGS. 4-6 may be a linear conveyor running past the loading station or a circular rotating distribution surface as shown in FIGS. 2 and 3 and described e.g. in WO2011/116774. Alternatively, it may be a blind conveyor ending at the loading station so that the movement into the holder 2 is simply a continuation of the movement on the conveyor.

Figure 7:
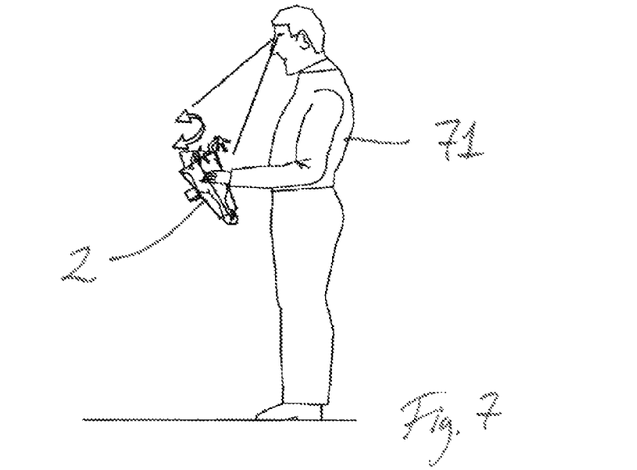
FIGS. 7-9 are sketches showing three different embodiments of combined monitoring and rotation stations for performing steps B) and C) of a method according to the invention.

The rotation may in principle be done manually as shown in FIG. 7 by an operator turning the holder. The holder is then preferably arranged in a passive mounting (not shown) such as a metal loop on a horizontal conveyor, but it is also possible to provide a motorised turning mechanism as will be described below, which can be activated by the operator 71. When rotating manually, turning the holder 2 instead of the bird 1 has the advantage that the operator is never in contact with the bird, hence keeping his hands clean.

Figure 8:
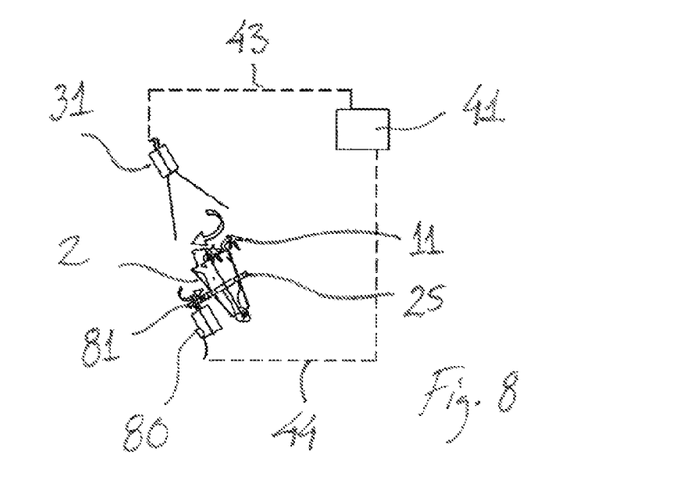

In FIG. 8 the rotation is automated using a camera 31 for determining the orientation of the feet 11 as also shown in sketch II of FIG. 1 and a motor 80 serving as an external rotation station for performing the actual rotation. A control system in the form of a computer 41 is provided for processing the camera data and sending control signals to the motor via cable 32 or wireless connections 43, 44, said control signals indicating how far the holder should be turned. This method of rotation is also illustrated in FIG. 2, where it is seen from above.

In one embodiment, which may be applied to a system as in FIG. 8, an image recognition program identifies the position of legs and/or feet and calculates the needed angle of rotation for bringing the legs and/or feet to the predetermined orientation. In another embodiment the position of the tail of the bird, which has a well defined special relationship to the position of the legs and feet and hence can be used for determining the orientation of these, is determined and in still another embodiment the camera is positioned at the neck end of the holder.

The actual rotation of the bird may be based solely on a calculated angle of rotation. In the embodiment in FIG. 8 the force from the motor 80 is transferred to the holder 2 via a drive member in the form of a gear wheel 81, which engages a toothed rack 25 on the outer side of the holder, and a precise angle of the rotation may be achieved by turning over a certain number of teeth of the rack. In other embodiments, the holder is provided with other types of physical or electronic position markers, such as magnets or electronic tags, and turned over a certain number of markers corresponding to the needed rotation. A sensor capable of detecting the chosen type of marker may be used for detecting the movement.

In still another embodiment the bird or holder is rotated at a known speed of rotation and for a certain time corresponding to the needed rotation.

If the feet 11 are already at the predetermined position, the holder is simply not rotated.

The motor 80 in FIG. 8 and like embodiments is preferably an electro motor and when using an image recognition system for determining the needed rotation, the motor is preferably capable of running both ways so that the rotation of the holder will never have to be more than 180 degrees.

Figure 9:
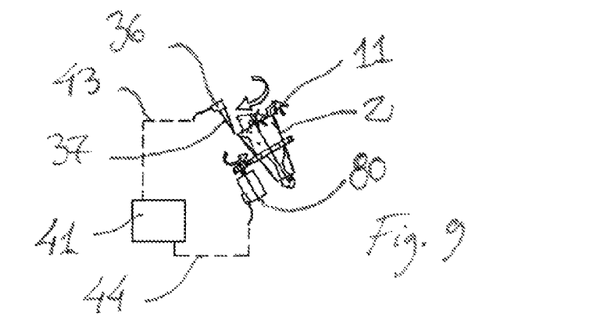

In FIG. 9 the camera has been replaced by a photo cell 36 detecting the presence of the feet 11 or legs 12 when the light beam 37 is broken and there is no need for an image recognition system. Though here described with reference to a photo cell it will be understood that other types or sensors, such as mechanical switches, induction switches or like sensor may also be used.

If the photo cell 36 or like sensor does not initially detect the presence or a leg or foot, it has been determined that the legs and/or feet are not in the predetermined position. The holder 2 may then simply be rotated until the photo cell detects the feet 11 or legs 12, the predetermined position being downwards to the left in FIG. 9. If two photo cells are provided next to each other to allow the detection of both feet or legs, one rotation will be sufficient for achieving an accurate determination of the orientation of the legs and/or feet.

When using only a single sensor, a reliable determination of the position of the bird may be determined by first rotating until the presence of a leg or foot is determined, then rotating approximately 180 degrees in the same direction to make sure that both legs and/or foot are away from the sensor, and then rotating still further in the same direction until the presence of a leg or foot is again determined. In this way it is possible to distinguish between the situation where the two legs are originally on either side of the sensor and the situation where both legs are on the same side of the sensor, so that it is always either the right or the left leg or foot, which ends up at the sensor.

The motor 80 and other means of rotation as well as the control system 41, 43, 44 in FIG. 9 are as in FIG. 8.

The different possibilities described above for determining the original orientation of the legs and/or feet and for determining when the predetermined orientation has been reached applies independently of the design of the holder, its angle of inclination etc. and thus also to the embodiments described below as well as other embodiments covered by the claims.

In FIGS. 8 and 9 the gear wheel of the motor 80 is engaging a toothed rack, but if using a system relying on friction and/or rotation of the bird inside the holder, the engagement between contacting surfaces may, be influences for example by humidity. It may therefore be advantageous to determine the position of the bird and/or the holder at least once during and/or after the rotation. This may for example be done by determining the position of the legs and/or feet using an image recognition program as described above. Another or supplemental option is to provide a marker on the holder and to determine the position of this marker in relation to the feet and/or legs before and after rotation, thereby determining any chance in the mutual position between the bird and a relevant part of the holder.

In the description above referring to FIGS. 7-9 the different methods of rotating the bird all rely on the holder being rotated, but it must be understood that the methods of determining the orientation of the legs and/or feet also applies to methods where the bird is rotated inside the holder. Likewise, though the birds in FIGS. 7-9 are all shown with feet, the methods described may also be used if the feet have previously been removed. It that case the image recognition software running on the computer 41 should of course be adapted for recognising legs instead of feet and likewise type and/or position of the sensor(s) 36 should be adapted for recognizing legs.

Figure 10:
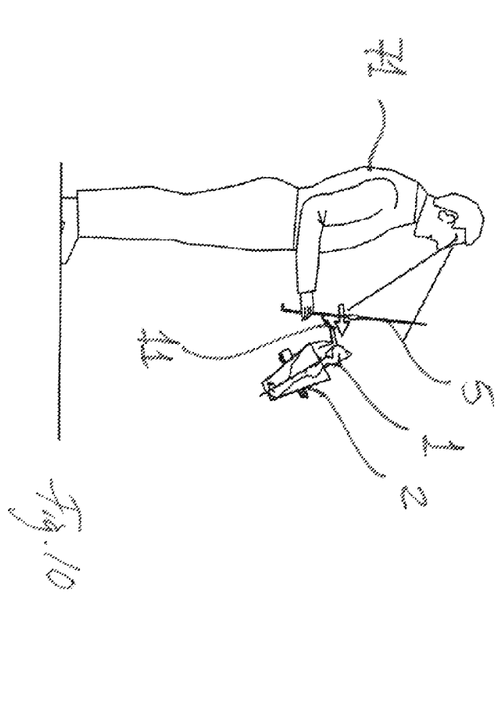
FIGS. 10-12 are sketches showing three different embodiments of transfer stations for performing step D) of a method according to the invention.
Figure 11:
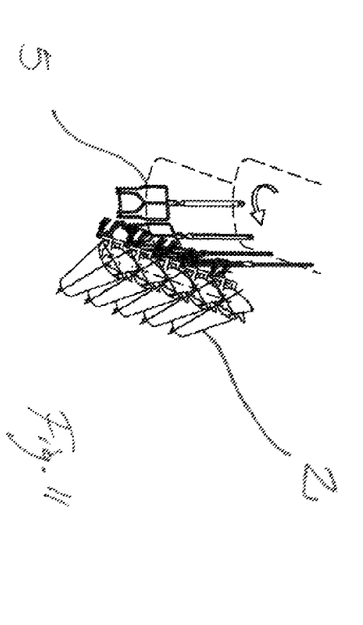

The transfer of the bird 1 from the holder 2 to the shackle 5 may also be performed manually by an operator 71 arranging the shackle correctly at the feet 11 as shown in FIG. 10.

Similar processes, where the bird is automatically taken from other types of holders have already been developed. It will therefore be relatively straightforward for the skilled person to determine the pattern of relative movement between the holders 2 and the shackles 5 needed for performing the transfer shown in FIG. 11. As opposed to what has been described with reference to FIG. 2, the holders 2 are here following a straight path, while the shackle conveyor turns at the transfer point as indicated by the punctured lines and the arrow, but the resulting relative movement is substantially the same.

Figure 12:
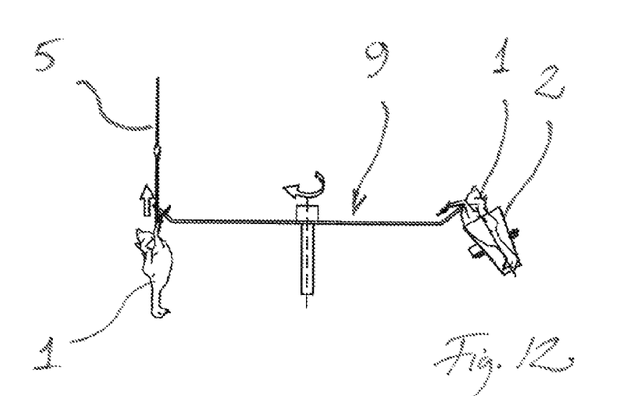

Yet another embodiment is shown in FIG. 12, where the bird 1 is lifted from the holder 2 by a carousel like transfer mechanism 9 and from here transferred to the shackles 5. Such carousels 9 are known for transfers between conveyor lines and will therefore not be described in detail here, but it is noted that the transfer from the holder 2 to the carousel 9 advantageously involves a downwards movement of the holder, whereas the carousel is kept at a substantially constant level.

Above the invention has been described with reference to holders having the shape of an open-ended frustum of a cone. FIGS. 13-19 show different embodiments of holders adapted for rotating the bird while keeping the holder substantially still. In these figures the same reference numbers as in FIGS. 1-12 have been used for features, which are substantially the same, but with 100 added in FIGS. 13-16, 200 added in FIG. 17, 300 added in FIG. 18 and 400 added in FIG. 19. Where nothing else is explained, these features have the same structure and function as described with reference to FIGS. 1-12. It is also to be understood that where nothing else is stated the methods of arranging the birds in the holders and for transferring them to shackles described above with reference to FIGS. 1-12 may also be used with these different holders.

Figures 13, 14:
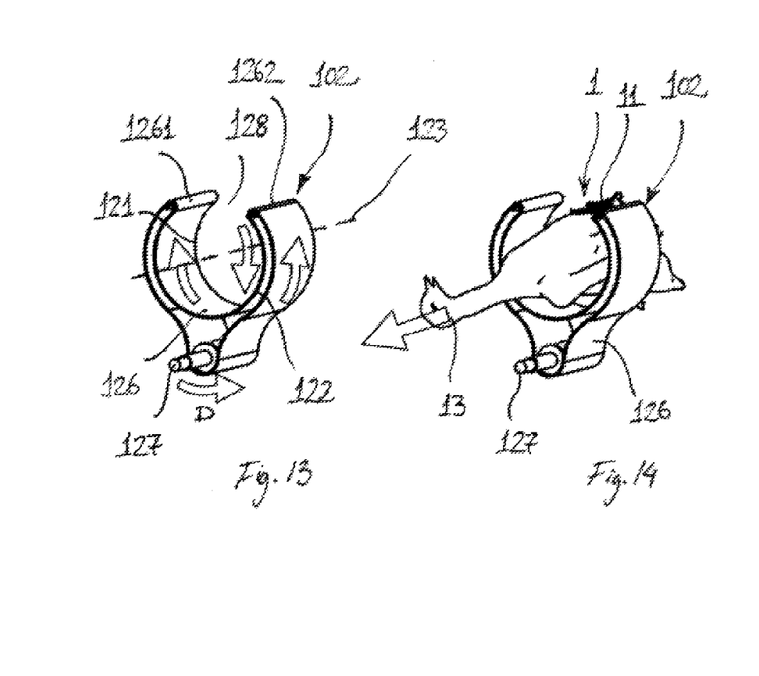
FIG. 13 shows a different embodiment of a bird holder.
FIGS. 14-16 are sketches showing how steps A) and C) may be performed using a holder of the type shown in FIG. 13, and FIGS. 17-19 are principle sketches of three other types of rotation stations.

FIG. 13 shows an embodiment of a holder 102 constituted by a continuous belt 126 and where the first and second openings 121,122 are of substantially the same diameter, giving the holder a cylindrical shape. The belt is arranged in two loops, an inner loop forming the inner side of the holder and an outer loop forming an outer side, all sections of the inner loop being located at a distance from the axis of rotation. A drive shaft 127 is arranged between them and engaging the outer loop.

The turning lines 1261,1262, where the two loops meet, are preferably formed by turning rollers (not shown), and a slit 128 allowing handling of the bird as described above with reference to FIGS. 4-6 is defined between the turning lines. Here the slit constitutes approximately one fifth of the circumference of the cylinder shape defined by the holder, but it is to be understood that it may be wide or narrower.

When turning the drive shaft 127 as shown by the arrow D, the belt will move in a direction perpendicular to and not intersecting the axis of rotation as shown by the other arrows in FIG. 13, thus causing the inner loop to rotate about the axis of rotation 123. As described with reference to the holders in FIGS. 8 and 9, each holder may in principle be provided with its own motor, but it is presently preferred that the drive shaft is brought into engagement with an external drive unit when arriving at the rotation station.

Turning now to FIG. 14 a bird 1 is inserted into the holder 102 as indicated by the arrow so that the holder surrounds the bird substantially entirely. This holder is arranged with the axis of rotation 123 being substantially horizontal to avoid that the bird slides out of the holder under the influence of gravity, but it is to be understood that means may be provided for changing the angle of the holder as described above, for example to ease transfer to shackles.

Figure 15:
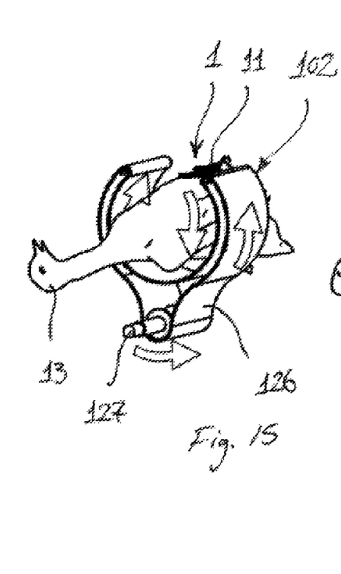
Figure 16:
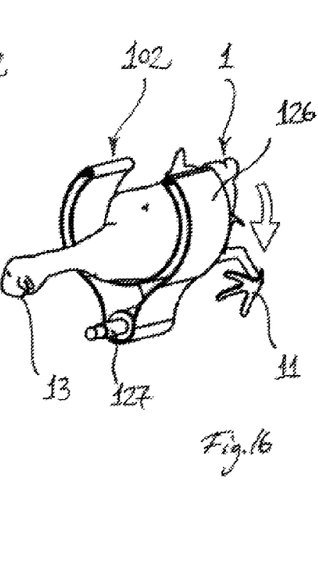

When the orientation of the legs and/or feet of the bird has been determined and found not to be in the predetermined orientation ready for shackling, the bird is turned as shown by the arrows in FIGS. 15 and 16. To make sure that the bird moves with the belt and does not just slide over it, the contacting surface of the belt facing the bird is made with a relatively high coefficient of friction, but it should of course not be so high that it becomes difficult to get the bird into and out of the holder. The exact properties of the belt will depend on the material used, the type of birds processed, temperature and other factors but is easily determined by a few experiments.

Figure 17:
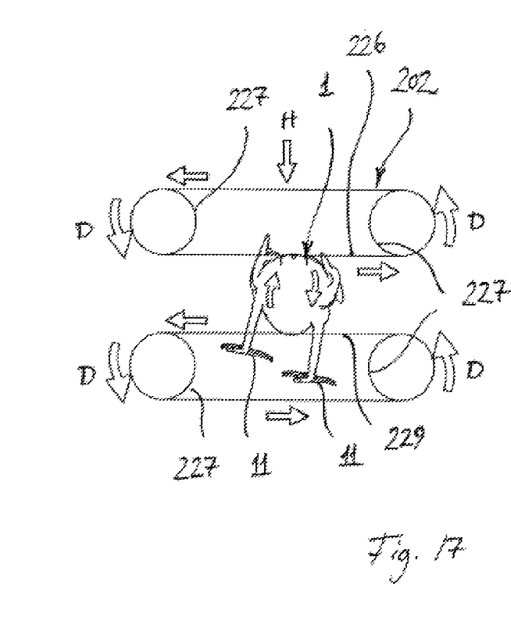
Figure 18:
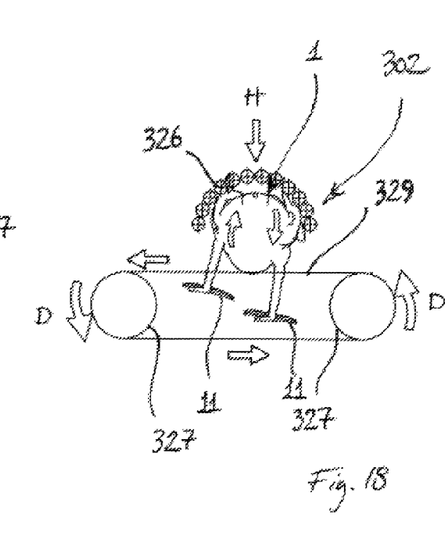
Figure 19:
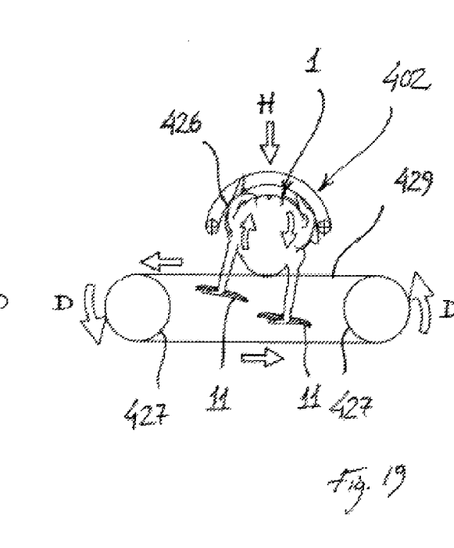

FIGS. 17-19 illustrate the principles behind three other methods for rotating birds in a rotation station. In all of these embodiments the bird 1 is arranged on a substantially flat support surface 229,329,429, serving as a first holder part, and a second holder part 226,326,426 is brought into contact with the bird by being lowered towards it as illustrated by the arrows H. The same effect may, however, also be achieved by raising the support surface 229,329,429 towards the second holder part 226,326,426 or by moving both of them towards each other. The first and second holder parts together form a holder 202,302,402 used for rotating the bird.

In FIG. 17 both holder parts 226,229 are embodied as continuous belts where at least one turning roller 227 is connected to a drive mechanism, which may be used for turning the roller as illustrated by the arrows D, thereby setting the belt in motion as also illustrated by arrows. When the friction between the bird and at least one of the belts 226,229 is sufficiently high, the movement of the belts will cause the bird to turn as illustrated by arrows. The needed friction may be achieved by adapting the surface characteristics of the belt as explained above with reference to FIGS. 13-16 and/or by adapting the contact pressure of the belt against the bird. In the latter case special care should, however, be taken to avoid damaging the bird.

Here both belts 226,229 are illustrated as being driven in the same direction, but this need not be the case. One of them may be passive, either stationary or free to move under the influence of friction, or moveable in the opposite direction to allow the bird to be stopped in a very precise position. The type of belts described with reference to FIGS. 13-16 may also be used here. It is also noted that the belt 229, as well as belts 329 and 429 which will described below, may be part of a conveyor taking the birds from a loading station to a shackling station and may therefore be considerably longer than illustrated in the drawing.

In FIG. 18 the second holder part 326 is formed by a series of rollers arranged in a semicircular configuration embracing the body of the bird. The rollers may be simple cylinders with a substantially continuous surface, but they may also be embodied as brushes, and different types of rollers may be combined.

When the belt 329 forming the first holder part is driven, the bird rotates as illustrated by arrows and the rollers of the 326 moves under the influence of friction, thereby avoiding damage to the bird. One or more of the rollers of the second holder part 326 may, however, also be driven, thereby contributing to the rotation of the bird as described above with reference to FIG. 17.

The embodiment in FIG. 19 corresponds to that in FIG. 18 except for the second holder 426 being a curved belt. As described with reference to FIGS. 17 and 18 the belt too may be driven in one or the other direction and may then be embodied as described with reference to FIGS. 13-16, this embodiment corresponding in principle to a combination of the embodiments in FIGS. 13 and 17. Though shown with the curved belt 426 on top and the straight belt 429 underneath the bird it will be understood that it may also be the opposite, so that the curved belt 426 forms a cradle for the bird just as the holder 102 in FIGS. 13-16. The same applies to the embodiment in FIG. 18.

As in FIG. 13-16 the embodiments in FIGS. 17-19 are illustrated as being substantially horizontal, but it would in principle be possible to arrange them inclined or even with a vertical axis of rotation by angling the first and second holders in relation to each other so that the space between them becomes wedge-shaped. In the embodiment in FIG. 18 a similar effect may be achieved by angling the individual rollers in relation to each other, thereby forming a cone-shape as described for the holders in FIGS. 1-12.

The embodiments in FIGS. 17-19 may also be made tiltable or with one or more conveyor sections being inclined so that the angle may be changed in connection with the birds being arranged in the holders and/or transferred to shackles.

In the above the invention has been described with reference to the processing of live or stunned birds prior to decapitation, but it will be understood that the method and apparatus may in principle also be used later in the slaughtering process. Likewise it is to be understood that the invention may also be used on birds where the feet have previously been removed.

The invention claimed is:

1. A method for suspending birds having body, neck, legs and possibly head and feet from an overhead conveyor, comprising the following sequence of steps:
   A) each bird is arranged in a holder with its legs and/or feet projecting from a first opening therein and its neck at a neck end of the holder,
   B) orientation of the legs and/or feet is determined,
   C) the bird is rotated about an axis of rotation extending between a plane defined by the first opening of the holder and a plane defined by the neck end of holder until a predetermined orientation of the legs and/or feet is reached, and
   D) the legs and/or feet of the bird are arranged in a shackle on the conveyor.

2. The method according to claim 1, where the holder has a second opening at the neck end, and where, in step A), the bird is arranged with its legs and/or feet at the first opening and its neck at the second opening.

3. The method according to claim 1, where, in step A), the bird is pulled into the holder, preferably by its head and/or neck.

4. The method according to claim 1, where, prior to step A), the bird is lying on a support surface.

5. The method according to claim 1, where, during step A), the holder is positioned so that the axis of rotation is substantially vertical or inclined at an angle not exceeding 45 degrees from a vertical plane.

6. The method according to claim 1, where, after step A), the holder is tilted so that an angle of the axis of rotation in relation to a vertical plane is changed.

7. The method according to claim 1, where the holder is rotated by being brought into engagement with a drive member of an external drive unit.

8. The method according to claim 1, where an inner surface of the holder, which is in contact with the bird after the completion of step A) and located at a distance from the axis of rotation, is moved in a direction perpendicular to the axis of the rotation during step C), thereby forcing the bird to rotate.

9. The method according to claim 1, where, in step B), a camera is used for determining the orientation of the feet and/or orientation of the legs, and where the rotation of the bird to be performed in step C) is calculated by a computer.

10. An apparatus for suspending birds having body, neck, legs and possibly head and feet from an overhead conveyor, comprising
    a plurality of holders each having a neck end adapted from receiving the neck of a bird and a first opening from which the legs and/or feet of the bird may project,
    a monitoring station for determining orientation of the legs and/or feet of each bird, and
    a rotation station for rotating the bird about an axis of rotation extending between a plane defined by the first opening of the holder and a plane defined by the neck end of the holder.

11. The apparatus according to claim 10, where the holders are hollow with a cavity corresponding substantially in size to the body of the birds to be processed, said holders preferably having a first opening and a second opening at the neck end.

12. The apparatus according to claim 11, where the first opening has a larger diameter that the second opening so that the holder has the shape of an open-ended frustum of a cone.

13. The apparatus according to claim 11, where each holder has a longitudinal slit extending between the first opening and the second opening.

14. The apparatus according to claim 10, where the holders are made from a sheet material, preferably from stainless steel or a polymer.

15. The apparatus according to claim 10, where each holder comprises an inner contact surface, which is located at a distance from the axis of rotation and moveable in a direction transverse to the axis of rotation, and which is adapted for being in contact with an outer surface of the bird, so that movement of the inner contact surface causes the bird to rotate.

16. The apparatus according to claim 15, where the inner contact surface of the holder is a belt, preferably made from a sheet, mesh or interconnected modules and of rubber, plastic or metal.

* * * * *